(12) United States Patent
Son

(10) Patent No.: US 10,960,918 B2
(45) Date of Patent: Mar. 30, 2021

(54) RACK BAR SUPPORTING DEVICE OF STEERING APPARATUS FOR VEHICLE

(71) Applicant: MANDO CORPORATION, Pyeongtaek-si (KR)

(72) Inventor: MyungSeob Son, Songpa-gu (KR)

(73) Assignee: MANDO CORPORATION, Pyeongtaek-si (KR)

( * ) Notice: Subject to any disclaimer, the term of this patent is extended or adjusted under 35 U.S.C. 154(b) by 302 days.

(21) Appl. No.: 15/914,268

(22) Filed: Mar. 7, 2018

(65) Prior Publication Data
US 2018/0257697 A1    Sep. 13, 2018

(30) Foreign Application Priority Data
Mar. 8, 2017 (KR) .......................... 10-2017-0029249

(51) Int. Cl.
*B62D 3/12* (2006.01)
*F16H 57/12* (2006.01)
(Continued)

(52) U.S. Cl.
CPC ............. *B62D 3/123* (2013.01); *F16H 19/04* (2013.01); *F16H 55/283* (2013.01); *F16H 57/12* (2013.01); *F16H 2057/126* (2013.01)

(58) Field of Classification Search
CPC .. F16H 55/28; F16H 55/283; F16H 2055/281; F16H 19/04; F16H 57/12; F16H 2057/126; B62D 3/123; B62D 3/12
See application file for complete search history.

(56) References Cited

U.S. PATENT DOCUMENTS

| 5,802,919 | A | * | 9/1998 | Phillips | ................. | F16H 55/283 |
| | | | | | | 384/37 |
| 6,119,540 | A | * | 9/2000 | Phillips | ................. | B62D 3/123 |
| | | | | | | 384/42 |

(Continued)

FOREIGN PATENT DOCUMENTS

| CN | 101734276 A | 6/2010 |
| CN | 103287484 A | 9/2013 |

(Continued)

OTHER PUBLICATIONS

Office Action issued in Chinese Patent Application No. 201810191638.6 dated Mar. 25, 2020.

*Primary Examiner* — Jake Cook
*Assistant Examiner* — Gregory Robert Weber
(74) *Attorney, Agent, or Firm* — Morgan, Lewis & Bockius LLP

(57) ABSTRACT

The present embodiments relate to a rack bar supporting device of a vehicle steering apparatus, which may include: a support yoke configured to be inserted into a cylinder of a gear box and configured to have a support recess famed on a front surface thereof to support a rack bar positioned in the lateral direction therein and a yoke hollow formed on a rear surface thereof so as to receive an elastic member; a yoke plug configured to have a plug hollow famed on a front surface thereof to receive the elastic member for supporting the support yoke toward the rack bar and configured to be connected to the cylinder of the gear box; and damping members configured to protrude from a rear surface of the support yoke so as to be supported by a front surface of the yoke plug when an impact load is reversely transferred from the road surface through the rack bar.

15 Claims, 9 Drawing Sheets

(51) Int. Cl.
*F16H 19/04* (2006.01)
*F16H 55/28* (2006.01)

(56) References Cited

U.S. PATENT DOCUMENTS

| | | | | |
|---|---|---|---|---|
| 6,142,031 A | * | 11/2000 | Phillips | ............... B62D 3/123 |
| | | | | 384/37 |
| 9,157,513 B2 | * | 10/2015 | Taenaka | ............... F16H 55/283 |
| 9,266,556 B2 | * | 2/2016 | Taenaka | ............... B62D 3/123 |
| 9,321,477 B2 | * | 4/2016 | Bae | ..................... B62D 3/123 |
| 2016/0201787 A1 | * | 7/2016 | Kimijima | ............. F16H 55/283 |
| | | | | 74/422 |

FOREIGN PATENT DOCUMENTS

| CN | 104163194 A | | 11/2014 | | |
|---|---|---|---|---|---|
| CN | 105564494 A | | 5/2016 | | |
| CN | 105774893 A | | 7/2016 | | |
| DE | 10247331 A1 | * | 5/2004 | ............. | B62D 3/123 |
| GB | 2397861 A | * | 8/2004 | ........... | F16H 55/283 |
| JP | 2012096678 A | * | 5/2012 | | |
| JP | 2012214165 A | * | 11/2012 | ............. | B62D 3/123 |
| JP | 2015093495 A | | 5/2015 | | |

* cited by examiner

RACK BAR SUPPORTING DEVICE OF STEERING APPARATUS FOR VEHICLE

CROSS REFERENCE TO RELATED APPLICATION

This application claims priority from Korean Patent Application No. 10-2017-0029249, filed on Mar. 8, 2017, which is hereby incorporated by reference for all purposes as if fully set forth herein.

BACKGROUND OF THE INVENTION

1. Field of the Invention

The present embodiments relate to a rack bar supporting device of a steering apparatus for a vehicle. More specifically, the present embodiments relate to a rack bar supporting device of a rack pinion steering apparatus for a vehicle, which is able to: compensate for an increase in the clearance caused by wear of a support yoke; prevent noise from being generated by an impact reversely input from the road surface; provide a driver with a comfortable steering feeling when turning a steering wheel; and support a rack bar using the same supporting force even when an impact load is generated from the road surface when the vehicle is traveling, thereby maintaining the steering stability.

2. Description of the Prior Art

In general, a vehicle steering apparatus is intended to change the traveling direction of a vehicle according to a driver's intention and is an auxiliary apparatus for assisting a driver to drive a vehicle in a desired direction by changing a turning center of a front wheel of the vehicle.

The vehicle steering apparatus includes a pinion gear and a rack gear, which are provided in a steering shaft and a rack bar, for turning the wheels through the steering shaft and the rack bar by the operation of a steering wheel provided in a driver's seat, and a rack bar supporting device for supporting the engagement of the pinion gear and the rack gear.

The rack bar supporting device is configured to include a support yoke, a spring, and a yoke plug for supporting the rack bar toward the pinion gear.

However, the conventional rack bar supporting device has problems in which the rack bar cannot be properly supported because clearance is increased due to wear of the support yoke and the rack bar and in which rattling noise is generated between the support yoke and the yoke plug due to an increase in the clearance.

In addition, when an impact load is generated from the road surface when the vehicle is traveling, imbalance occurs in the supporting force of the support yoke for the rack bar, thereby deteriorating the steering stability.

SUMMARY OF THE INVENTION

The present embodiments have been made in the background described above, and an aspect of the present embodiments is to provide a rack bar supporting device that is able to compensate for an increase in the clearance caused by wear of a support yoke in the vehicle steering apparatus and to prevent noise from being generated by an impact reversely input from the road surface, thereby providing a driver with a comfortable steering feeling when turning a steering wheel.

Another aspect of the present embodiments is to provide a rack bar supporting device that is able to support a rack bar using the same supporting force even when an impact load is generated from the road surface when the vehicle is traveling, thereby maintaining the steering stability.

Further, the aspect of the present disclosure is not limited thereto, and other unmentioned aspects of the present disclosure may be clearly appreciated by those skilled in the art from the following descriptions.

In view of the above aspects, the present embodiments provide a rack bar supporting device of a vehicle steering apparatus, which may include: a support yoke configured to be inserted into a cylinder of a gear box and configured to have a support recess formed on a front surface thereof to support a rack bar positioned in the lateral direction and a yoke hollow formed on a rear surface thereof to receive an elastic member therein; a yoke plug configured to have a plug hollow formed on a front surface thereof to receive the elastic member for supporting the support yoke toward the rack bar and configured to be connected to the cylinder of the gear box; and a damping member configured to protrude from a rear surface of the support yoke so as to be supported by a front surface of the yoke plug when an impact load is reversely transferred from the road surface through the rack bar.

According to the present embodiments having the structure and shape described above, it is possible to compensate for an increase in the clearance caused by wear of a support yoke and to prevent noise from being generated by an impact reversely input from the road surface, thereby providing a driver with a comfortable steering feeling when turning a steering wheel.

In addition, it is possible to support a rack bar using the same supporting force even when an impact load is generated from the road surface when the vehicle is traveling, thereby maintaining the steering stability.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
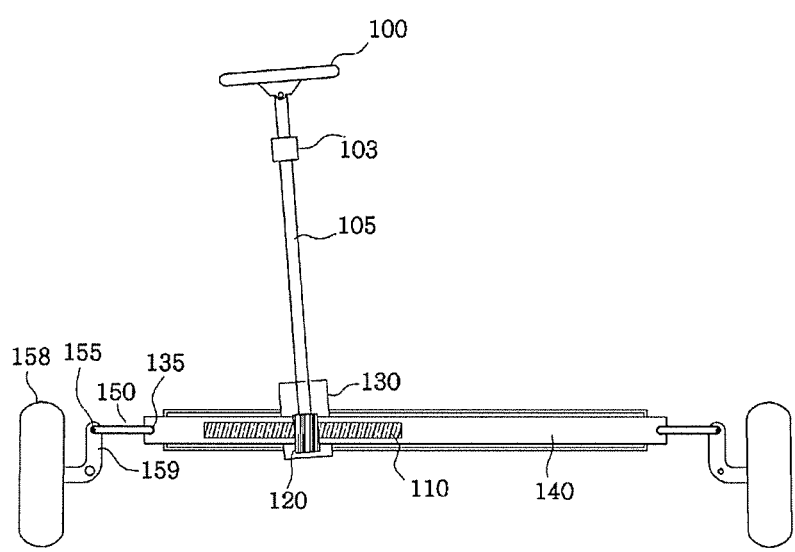
FIG. 1 is a schematic configuration diagram of a vehicle steering apparatus according to the present embodiments.

Hereinafter, embodiments will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terns, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
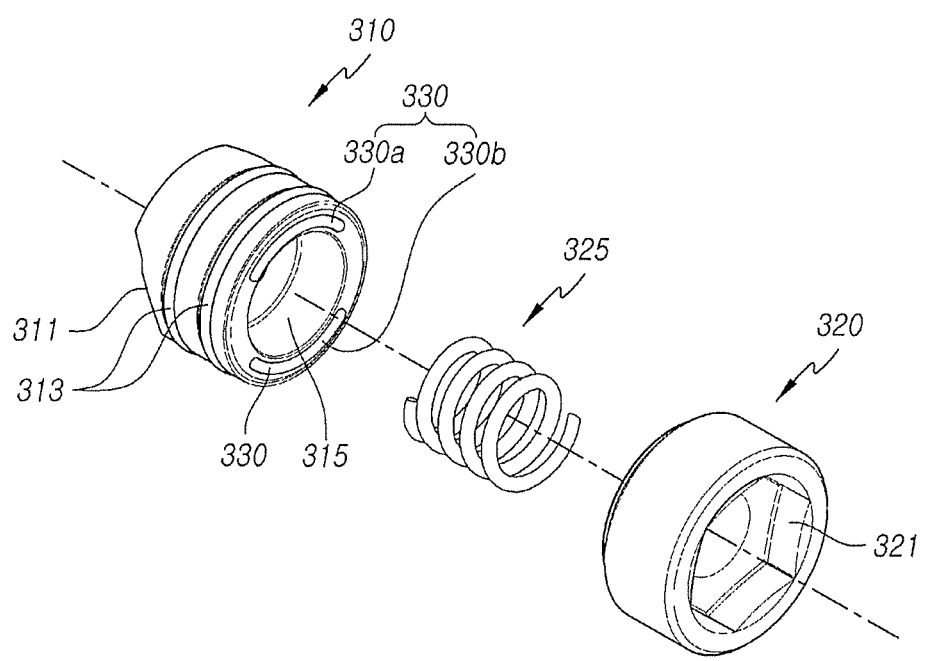
FIG. 2 is an exploded perspective view showing a part of a rack bar supporting device according to the present embodiments.
Figure 3:
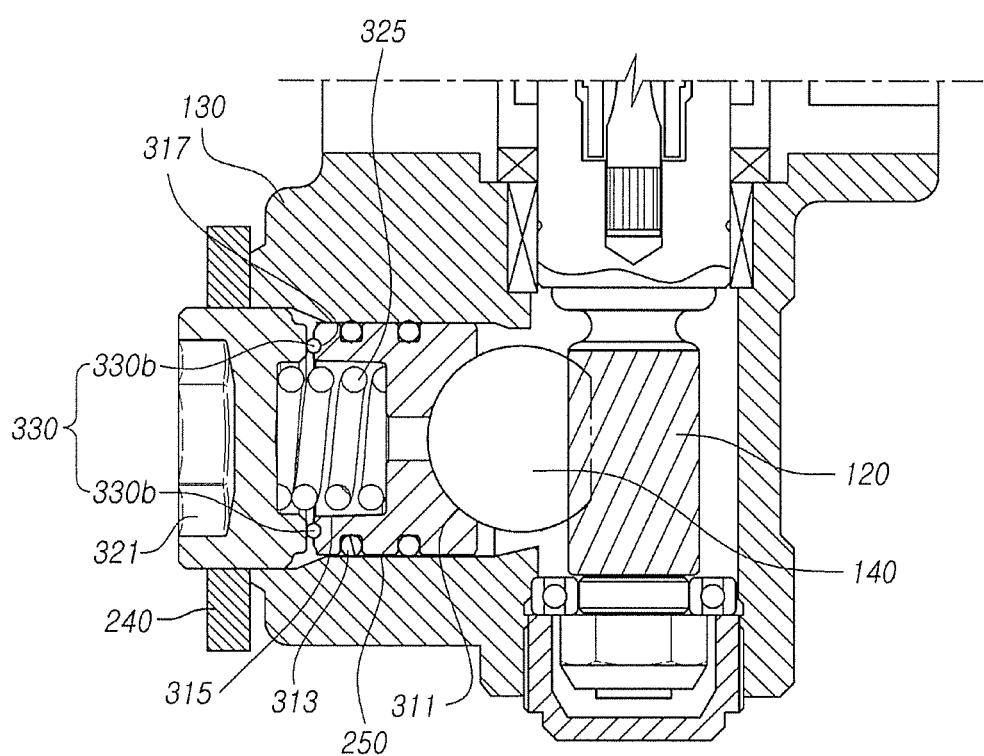
FIG. 3 is a cross-sectional view showing a part of a rack bar supporting device according to the present embodiments.
Figure 4:
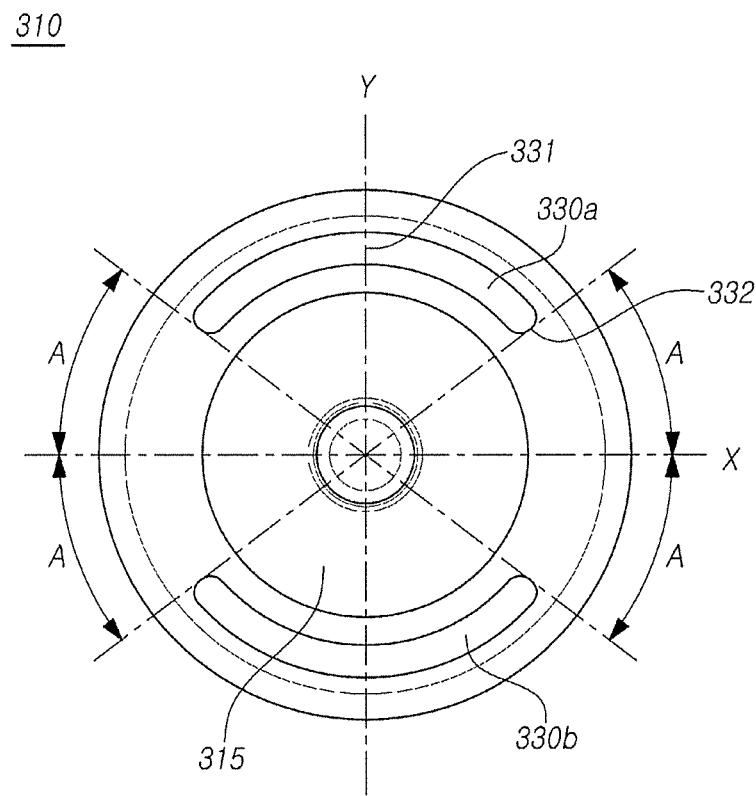
FIG. 4 is a front view showing a part of a rack bar supporting device according to the present embodiments.
Figure 5:
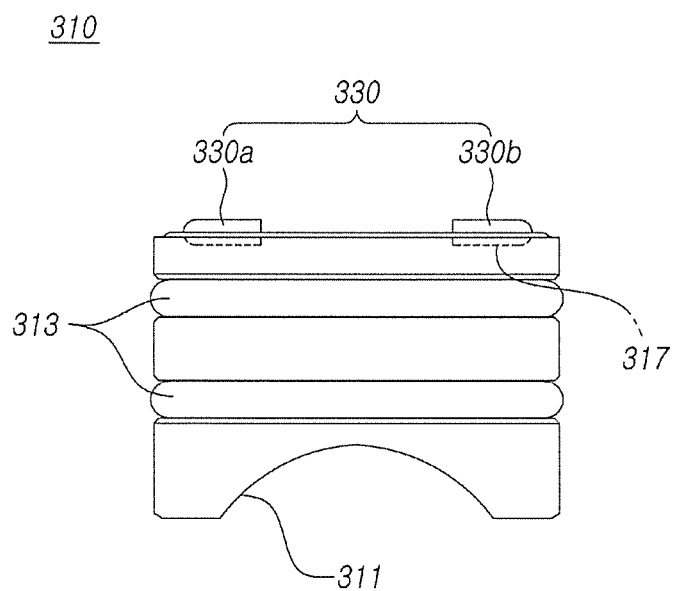
FIG. 5 is a side view showing a part of a rack bar supporting device according to the present embodiments.
Figure 6:
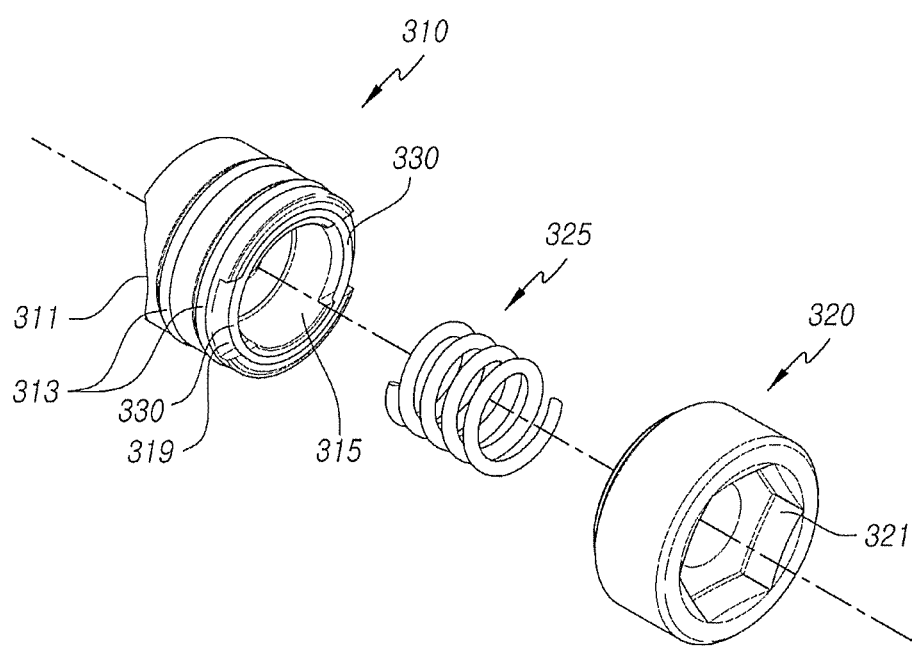
FIG. 6 is an exploded perspective view showing a part of a rack bar supporting device according to the present embodiments.
Figure 7:
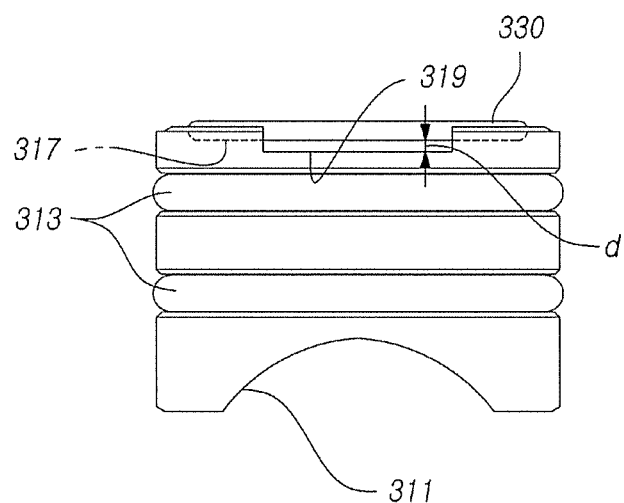
FIG. 7 is a side view showing a part of a rack bar supporting device according to the present embodiments.
Figure 8:
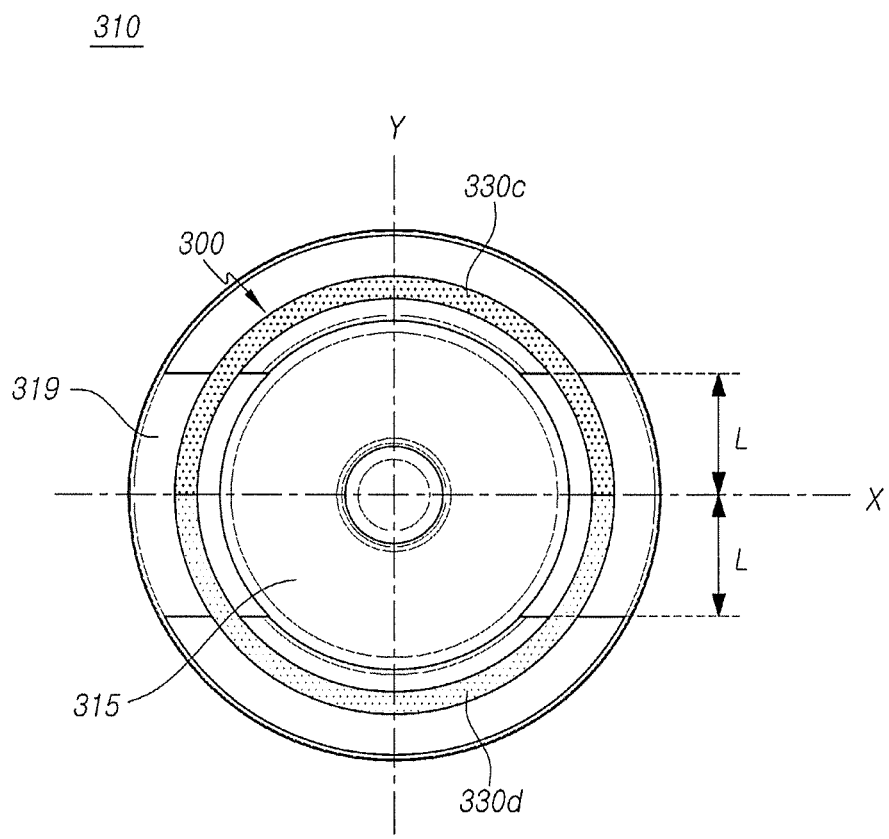
FIGS. 8 and 9 are front views showing a part of rack bar supporting devices according to the present embodiments.
Figure 9:
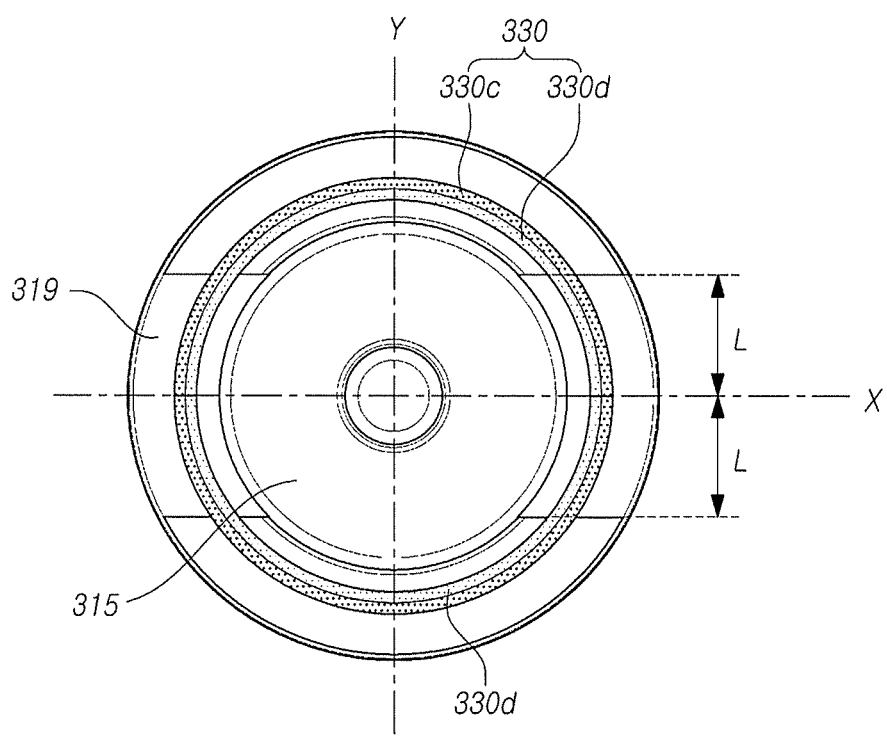

FIG. 1 is a schematic configuration diagram of a vehicle steering apparatus according to the present embodiments, and FIG. 2 is an exploded perspective view showing a part of a rack bar supporting device according to the present embodiments. FIG. 3 is a cross-sectional view showing a part of a rack bar supporting device according to the present embodiments, and FIG. 4 is a front view showing a part of a rack bar supporting device according to the present embodiments. FIG. 5 is a side view showing a part of a rack bar supporting device according to the present embodiments, and FIG. 6 is an exploded perspective view showing a part of a rack bar supporting device according to the present embodiments. FIG. 7 is a side view showing a part of a rack bar supporting device according to the present embodiments, and FIGS. 8 and 9 are front views showing a part of rack bar supporting devices according to the present embodiments.

Referring to FIG. 1, a rack pinion-type vehicle steering apparatus is configured to include: a steering wheel 100 provided in a driver's seat; a steering shaft 105 connected to the steering wheel; a steering column 103 for fixing the steering shaft to the vehicle body; a gear box 130 including a rack gear 110 and a pinion gear 120 for converting a rotational force input from the steering shaft 105 into a linear motion; a rack bar 140 having inner ball joints 135 at both ends thereof; and a tie rod 150 formed integrally with a ball of the inner ball joint 135.

The tie rod 150 is connected to an outer ball joint 155 and transfers a force to a knuckle 159, thereby steering a tire 158.

The rack bar 140 is engaged with the pinion gear 120 to convert a rotational motion into a linear motion. A device for supporting the rack bar 140 toward the pinion gear 120 is provided at the rear of the rack bar 140 in order to ensure the engagement of the rack bar 140 and the pinion gear 120.

The device for supporting the rack bar 140 is configured to include a support yoke 310, an elastic member 325, and a yoke plug 320. The support yoke 310 is positioned on the rear surface of the rack bar 140 (i.e., the surface opposite a surface on which the rack gear 110 is formed) and is inserted into a cylinder 250 of the gear box 130, thereby moving in the direction perpendicular to the rack bar 140 (i.e., in the forward and backward direction).

The support yoke 310 has a cylindrical shape so as to slide forward and backward in the cylinder 250 and a semi-circular recess is formed at a front portion in contact with the rack bar 140 so as to come into contact with the rear surface of the rack bar 140.

In addition, the elastic member 325 may be disposed at the rear of the support yoke 310 to push the support yoke 310 by a constant pressure so that the rack bar 140 and the pinion gear 120 come into contact with each other and effectively transfer force, thereby compensating for the clearance generated between the rack bar 140 and the pinion gear 120.

The elastic member 325 accommodated in the yoke hollow 315 functions to apply pressure such that the support yoke 310 comes into close contact with the rack bar 140. Generally, a coil spring may be used as the elastic member, and the yoke plug 320 is positioned on the rear surface of the elastic member 325 so as to support the same.

The yoke plug 320 supports the elastic member 325 so as to apply pressure to the support yoke 310. The yoke plug 320 is usually formed with threads to be engaged with threads famed on the gear box 130 and the lock nut 240.

A rack bar supporting device of a vehicle steering apparatus, according to present embodiments, includes: a support yoke 310 configured to be inserted into a cylinder 250 of a gear box 130 and configured to have a support recess 311 formed on the front surface thereof to support a rack bar 140 positioned in the lateral direction therein and a yoke hollow 315 formed on the rear surface thereof to receive an elastic member 325; a yoke plug 320 configured to have a plug hollow (not indicated by a reference numeral) formed on the front surface thereof to receive the elastic member 325 for supporting the support yoke 310 toward the rack bar 140 and configured to be connected to the cylinder 250 of the gear box 130; and a damping member 330 configured to protrude from the rear surface of the support yoke 310 so as to be supported by the front surface of the yoke plug 320 when an impact load is reversely transferred from the road surface through the rack bar 140.

In the operation of the vehicle steering apparatus, when the driver turns the steering wheel (see 100 in FIG. 1), the steering shaft (see 105 in FIG. 1) connected to the steering wheel is rotated, and then the pinion gear 120 connected to the lower end of the steering shaft drives the rack bar 140.

In the detailed description of the present embodiments, unless otherwise stated, the direction toward the rack bar 140 in front of the support yoke 310 will be referred to as a "forward direction", and the reverse direction thereof will be referred to as a "backward direction" for the convenience of explanation.

The rack bar 140 is engaged with the pinion gear 120 to convert a rotational motion of the steering shaft into a linear motion, and a rack bar supporting device for supporting the rack bar 140 toward the pinion gear 120 is provided on the rear surface of the rack bar 140 in order to ensure the engagement of the rack bar 140 and the pinion gear 120.

The rack bar supporting device in the present embodiment generally includes the support yoke 310, the damping member 330, the elastic member 325, the yoke plug 320, and the like. A yoke support member supports the support yoke 310 toward the rack bar 140 by means of the elastic member 325 supporting the rear portion of the support yoke 310.

Referring to FIGS. 2 to 5, the support yoke 310 having an elastic ring 313 coupled to the outer circumferential surface thereof, which is inserted into the cylinder 250 of the gear box 130, has a support recess 311 foamed on the front surface thereof in order to support the rack bar 140 disposed in the lateral direction. The support recess 311 is formed in an arc shape such that the upper and lower portions thereof, which are positioned in the direction (Y) perpendicular to the direction (X) in which the rack bar 140 is disposed, protrude, thereby supporting the rear surface of the rack bar 140 when the rack bar 140 reciprocates in the lateral direction.

The support yoke 310 has the yoke hollow 315 foamed on the rear surface thereof to receive the elastic member 325, thereby supporting the rack bar 140 using the elastic force of the elastic member 325.

The yoke plug 320 coupled to the cylinder 250 of the gear box 130 has a plug hollow formed on the front surface thereof to receive the elastic member 325, thereby supporting the support yoke 310 toward the rack bar 140 using the elastic force of the elastic member 325. The yoke plug 320 is fixed to a housing of the gear box 130 by the lock nut 240 using a tool recess 321.

The damping members 330 protruding from the rear surface of the support yoke 310 are supported by the front surface of the yoke plug 320 when an impact load is reversely transferred from the road surface through the rack bar 140, thereby absorbing the impact load to perform a damping function.

The damping members 330 may be provided on the rear surface of the support yoke 310 at the upper portion and the lower portion (Y) perpendicular to the direction (X) in which the rack bar 140 is disposed, and may be connected to, or faulted integrally with, a seating groove 317 formed in the support yoke 310.

The damping members 330 are disposed, in the circumferential direction, between the yoke hollow of the support yoke 310 and the outer circumferential surface of the support yoke 310, and are positioned at the symmetrical upper and lower portions in the direction (Y) perpendicular to the direction (X), in which the rack bar 140 is disposed, on the rear surface of the support yoke 310, so that the supporting force for supporting the impact load reversely input from the rack bar 140 may be uniformly distributed in the vertical direction.

In addition, as shown in FIG. 4, the damping member 330 may be positioned such that both ends 332 of the damping member 330 form an angle (A) of 30 to 50 degrees with the direction (X), in which the rack bar 140 is disposed, based on the center of the rear surface of the support yoke 310, so that the supporting force becomes higher in specific areas in the vertical direction when supporting the impact load reversely input from the rack bar 140, thereby preventing the friction between the rack bar 140 and the pinion gear 120 from being increased.

That is, the impact load reversely input from the road surface is generated in the vertical direction due to the unevenness of the road surface and is transferred to the rack bar 140 via the tie rod 150, wherein the load is transferred to the upper and lower portions, which are positioned in the direction (Y) perpendicular to the direction (X) in which the rack bar 140 is disposed, of the support yoke 310 supporting the rack bar 140.

Therefore, if the supporting force in the vertical direction is the same as that in the lateral direction, the supporting force of the damping member 330 will be excessively high in all directions and thus the friction between the rack bar 140 and the pinion gear 120 will be increased, thereby deteriorating a steering feeling of a driver because a greater steering force is required and, in severe cases, resulting in breakage of the gears.

Accordingly, the damping member 330 is usually maintained to be pressed to generate a small supporting force, and when an impact load is transferred to the upper or lower end thereof, the amount of pressing onto the damping member 330 is increased at the upper or lower end according thereto, thereby providing a large supporting force in the vertical direction.

When both ends 332 of the damping member 330 are positioned to foam an angle less than 30 degrees with the direction (X), in which the rack bar 140 is disposed, based on the center of the rear surface of the support yoke 310, the friction between the rack bar 140 and the pinion gear 120 is increased because the lateral-direction supporting force becomes larger as described above, thereby deteriorating a steering feeling of a driver because a greater steering force is required and, in severe cases, resulting in breakage of the gears.

When both ends 332 of the damping member 330 are positioned to form an angle more than 50 degrees with the direction (X), in which the rack bar 140 is disposed, based on the center of the rear surface of the support yoke 310, the vertical-direction supporting force is reduced due to a decrease in the area supporting the damping member 330 at the upper and lower ends of the support yoke 310, so that the shock cannot be properly absorbed and shock noise may be generated.

Therefore, in order to maintain the optimum supporting forces in the vertical and lateral directions of the damping member 330, both ends 332 of the damping member 330 are positioned to form an angle of 30 to 50 degrees with the direction (X), in which the rack bar 140 is disposed, based on the center of the rear surface of the support yoke 310.

In addition, in order to maintain the optimum supporting forces of the damping member 330 in the vertical and lateral directions, the amount of protrusion from the rear surface of the support yoke 310 may be reduced as it goes from the central portion 331 of the damping member 330 to the both ends 332 thereof.

In this case, the supporting force of the damping member 330 in the vertical direction becomes large and the supporting force is gradually reduced as it goes to the both ends thereof while maintaining the area of the damping member 330 for absorbing the impact load, thereby maintaining the optimum supporting forces in the vertical and lateral directions without an excessive lateral-direction supporting force.

The damping member 330 is formed of an elastic material and is assembled between the rear surface of the support yoke 310 and the front surface of the yoke plug 320 while being elastically pressed and defaulted therebetween.

Since the damping member 330 is required to be formed of a material having predetermined warpage, elasticity, and rigidity and capable of absorbing vibration and noise, it may be formed of an elastic material, such as natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, silicone, and the like, which have the above properties.

The damping member 300 is configured to minimize a change in the supporting force of the damping member depending on temperature by adopting the configuration in which the damping member 330a provided at the upper portion on the rear surface of the support yoke 310 is faulted of a material different from that of the damping member 330b provided at the lower portion on the rear surface of the support yoke 310.

Here, one of the damping member 330a provided at the upper portion on the rear surface of the support yoke 310 and the damping member 330b provided at the lower portion on the rear surface of the support yoke may be famed of natural rubber (NR), and the other thereof may be formed of nitrile butadiene rubber (NBR).

As shown in FIGS. 6 to 9, the damping member 330 may be formed in a ring shape and cutaway grooves 319 may be formed on both sides of the rear surface of the support yoke 310 in the direction (X), in which the rack bar 140 is disposed, in order to allow the vertical-direction supporting force of the damping member 330 to be increased and the lateral-direction supporting force thereof to be reduced.

That is, when an impact load is reversely input from the road surface and the damping members 330 are supported and pressed by the front surface of the yoke plug 320, the damping members 330 are expanded to the empty space of the cutaway grooves 319 formed in the lateral direction on both sides thereof, so that the lateral-direction supporting force of the damping member 330 becomes less than the vertical-direction supporting force thereof.

In addition, the cutaway grooves 319 may be provided at symmetrical positions in the lateral direction (X) in which the rack bar 140 is disposed so that the damping member 330 may uniformly support the support yoke 310 by means of the lateral-direction supporting force.

Both ends of each of the cutaway grooves 319 may be provided at the positions spaced the same distance (L) from the central portion of the rear surface of the support yoke 310 in the direction (Y) perpendicular to the direction (X) in which the rack bar 140 is disposed, thereby supporting the support yoke 310 by the uniform vertical-direction supporting force.

As shown in FIG. 7, the cutaway groove 319 is formed so as to have a gap (d) formed between the bottom surface of the cutaway groove 319 and the bottom surface of the damping member 330, so that the gap between the cutaway groove 319 and the damping member 330 compensates for the amount of pressing onto the damping member 330 by the yoke plug 320 when an impact load is transferred from the road surface, thereby preventing the lateral-direction supporting force of the damping member 330 from being excessively high.

The damping member 330 is made of an elastic material and is assembled between the rear surface of the support yoke 310 and the front surface of the yoke plug 320 while being elastically pressed and deformed therebetween.

Since the damping member 330 is required to be formed of a material having predetermined warpage, elasticity, and rigidity and capable of absorbing vibration and noise, it may be formed of an elastic material, such as natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, silicone, and the like, which have the above properties.

As shown in FIG. 8, the damping member 300 having a ring shape may be configured such that respective portions W 330c and 330d divided in the circumferential direction are formed of different elastic materials from each other, thereby minimizing a change in the supporting force of the damping member depending on a change in the temperature.

Here, one of the circumferentially divided portions 330c and 330d of the damping member 330 may be made of natural rubber (NR), and the other thereof may be made of nitrile butadiene rubber (NBR).

With regard to the damping member 300, as shown in FIG. 9, respective portions 330c and 330d having a ring shape, which are divided in the radial direction, may be formed of different elastic materials from each other, thereby minimizing a change in the supporting force of the damping member depending on a change in the temperature.

Here, one of the radially divided portions 330c and 330d of the damping member 330 may be made of natural rubber (NR), and the other thereof may be made of nitrile butadiene rubber (NBR).

The rack bar supporting device constitutes the vehicle steering apparatus together with the steering shaft 105, the pinion gear 120 connected to the steering shaft 105, the gear box 130 accommodating the rack bar 140 having the rack gear 110 foamed therein to be engaged with the pinion gear 120, and the like.

According to the present embodiments having the structure and shape described above, it is possible to compensate for an increase in the clearance caused by wear of a support yoke and to prevent noise from being generated by the impact reversely input from the road surface, thereby providing a driver with a comfortable steering feeling when turning a steering wheel.

In addition, it is possible to support a rack bar using the same supporting force even when an impact load is generated from the road surface when the vehicle is traveling, thereby maintaining the steering stability.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A rack bar supporting device of a vehicle steering apparatus, the rack bar supporting device comprising:
   a support yoke configured to have a support recess extending through a front surface of the support yoke and a yoke hollow extending through a rear surface of the support yoke, so as to receive an elastic member;
   a yoke plug configured to have a plug hollow extending through a front surface of the yoke plug to accommodate a portion of the elastic member; and
   a damping member configured to protrude from the rear surface of the support yoke so as to be supported by the front surface of the yoke plug, wherein the damping member includes at least one of natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, or silicone, the damping member includes a first portion and a second portion on the rear surface of the support yoke, and one of the first and second portions of the damping member includes one of natural rubber (NR) and nitrile butadiene rubber (NBR), and another of the first and second portions of the damping member includes another of natural rubber (NR) and nitrile butadiene rubber (NBR).

2. The rack bar supporting device of claim 1, wherein the damping member is disposed between the yoke hollow of the support yoke and an outer circumferential surface of the support yoke and extends in a circumferential direction.

3. The rack bar supporting device of claim 1, wherein the first and second portions of the damping member are disposed symmetrical on the rear surface of the support yoke with respect to the yolk hollow.

4. The rack bar supporting device of claim 2, wherein each end of the first and second portions of damping member are provided so as to have an angle of 30 to 50 degrees with a direction, in which a rack bar is disposed, based on a center of the rear surface of the support yoke.

5. The rack bar supporting device of claim 2, wherein an amount of protrusion of the first portion of the damping member from the rear surface of the support yoke is reduced as the protrusion of the first portion goes from a central portion of the first portion of the damping member to both ends of the first portion, and an amount of protrusion of the second portion of the damping member from the rear surface of the support yoke is reduced as the protrusion of the second portion goes from a central portion of the second portion of the damping member to both ends of the second portion.

6. The rack bar supporting device of claim 2, wherein the damping members are disposed between the rear surface of the support yoke and the front surface of the yoke plug while being elastically pressed and deformed therebetween.

7. The rack bar supporting device of claim 1, wherein the damping member has a ring shape, and cutaway grooves are disposed at both sides on the rear surface of the support yoke in a direction in which a rack bar is disposed.

8. The rack bar supporting device of claim 7, wherein the cutaway grooves are provided at symmetrical positions in a lateral direction in which the rack bar is disposed.

9. The rack bar supporting device of claim 8, wherein both ends of the respective cutaway grooves are spaced the same distance apart from a central portion of the rear surface of the support yoke in a direction perpendicular to the lateral direction in which the rack bar is disposed.

10. The rack bar supporting device of claim 7, wherein a gap is provided between a bottom surface of the cutaway grooves and a bottom surface of the damping member.

11. The rack bar supporting device of claim 7, wherein the damping member is disposed between the rear surface of the support yoke and the front surface of the yoke plug while being elastically pressed and deformed therebetween.

12. The rack bar supporting device of claim 7, wherein the first and second portions of the damping member, which are divided in a circumferential direction.

13. The rack bar supporting device of claim 7, wherein the first and second portions of the damping member are divided in a radial direction.

14. A rack bar supporting device of a vehicle steering apparatus, the rack bar supporting device comprising:

a support yoke configured to be inserted into a cylinder of a gear box and configured to have a support recess formed on a front surface thereof to support a rack bar positioned in a lateral direction therein and a yoke hollow formed on a rear surface thereof so as to receive an elastic member;

a yoke plug configured to have a plug hollow formed on a front surface thereof to receive the elastic member for supporting the support yoke toward the rack bar and configured to be connected to the cylinder of the gear box; and damping members configured to protrude from a rear surface of the support yoke so as to be supported by a front surface of the yoke plug when an impact load is reversely transferred from the road surface through the rack bar, wherein the damping members are provided at an upper portion and a lower portion, which are positioned in a direction perpendicular to the lateral direction in which the rack bar is disposed, on the rear surface of the support yoke, and the damping members are configured such that a damping member provided at an upper portion of the rear surface of the support yoke includes a material different from that of a damping member provided at a lower portion of the rear surface of the support yoke.

15. The rack bar supporting device of claim 14, wherein one of the damping member provided at the upper portion of the rear surface of the support yoke and the damping member provided at the lower portion of the rear surface of the support yoke includes natural rubber (NR), and another of the damping member provided at the upper portion of the rear surface of the support yoke and the damping member provided at the lower portion of the rear surface of the support yoke includes nitrile butadiene rubber (NBR).

* * * * *